United States Patent
Chen et al.

(10) Patent No.: US 10,969,631 B2
(45) Date of Patent: Apr. 6, 2021

(54) LIQUID CRYSTAL PANEL

(71) Applicant: Au Optronics Corporation, Hsinchu (TW)

(72) Inventors: Chih-Hao Chen, Hsinchu (TW); Min-Zi Hong, Hsinchu (TW); Liang-Yin Huang, Hsinchu (TW); Seok-Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 22 days.

(21) Appl. No.: 16/595,489

(22) Filed: Oct. 8, 2019

(65) Prior Publication Data

US 2020/0355966 A1 Nov. 12, 2020

(30) Foreign Application Priority Data

May 10, 2019 (TW) ................. 108116225

(51) Int. Cl.
| | |
|---|---|
| *G02F 1/1337* | (2006.01) |
| *G02F 1/1333* | (2006.01) |
| *G02F 1/13363* | (2006.01) |
| *G02F 1/137* | (2006.01) |

(52) U.S. Cl.
CPC ........ *G02F 1/133753* (2013.01); *G02F 1/137* (2013.01); *G02F 1/13363* (2013.01); *G02F 1/133377* (2013.01); *G02F 2001/13706* (2013.01); *G02F 2001/133631* (2013.01)

(58) Field of Classification Search
None
See application file for complete search history.

(56) References Cited

U.S. PATENT DOCUMENTS

| | | |
|---|---|---|
| 7,002,662 B2 | 2/2006 | Umeya |
| 7,274,427 B2 | 9/2007 | Umeya |
| 2003/0071960 A1 | 4/2003 | Umeya |
| 2006/0082720 A1 | 4/2006 | Umeya |
| 2013/0330561 A1 | 12/2013 | Schipfer et al. |
| 2017/0363889 A1 | 12/2017 | Zhou et al. |

(Continued)

FOREIGN PATENT DOCUMENTS

| | | |
|---|---|---|
| CN | 1412612 | 4/2003 |
| CN | 102173153 | 9/2011 |

(Continued)

*Primary Examiner* — Richard H Kim
(74) *Attorney, Agent, or Firm* — JCIPRNET

(57) ABSTRACT

A liquid crystal panel includes a substrate and a display medium layer. The display medium layer is located on the substrate. The display medium layer includes multiple first liquid crystal capsules and multiple second liquid crystal capsules. Each of the first liquid crystal capsules includes multiple first liquid crystal molecules. A dielectric anisotropy $\Delta\varepsilon$ of the first liquid crystal molecules is greater than 0. A refractive index of the first liquid crystal capsules on the z-axis is greater than refractive indices of the first liquid crystal capsules on the x-axis and on the y-axis. Each of the second liquid crystal capsules includes second liquid crystal molecules. A dielectric anisotropy $\Delta\varepsilon$ of the second liquid crystal molecules is greater than 0. A refractive index of the second liquid crystal capsules on the z-axis is smaller than refractive indices of the second liquid crystal capsules on the x-axis and on the y-axis.

14 Claims, 16 Drawing Sheets

(56) References Cited

U.S. PATENT DOCUMENTS

2018/0120608 A1   5/2018  Ha et al.
2019/0155072 A1*  5/2019  Hwang ............. G02F 1/133512

FOREIGN PATENT DOCUMENTS

| CN | 103384570 | 11/2013 |
| CN | 105824145 | 8/2016 |
| CN | 108008560 | 5/2018 |

* cited by examiner

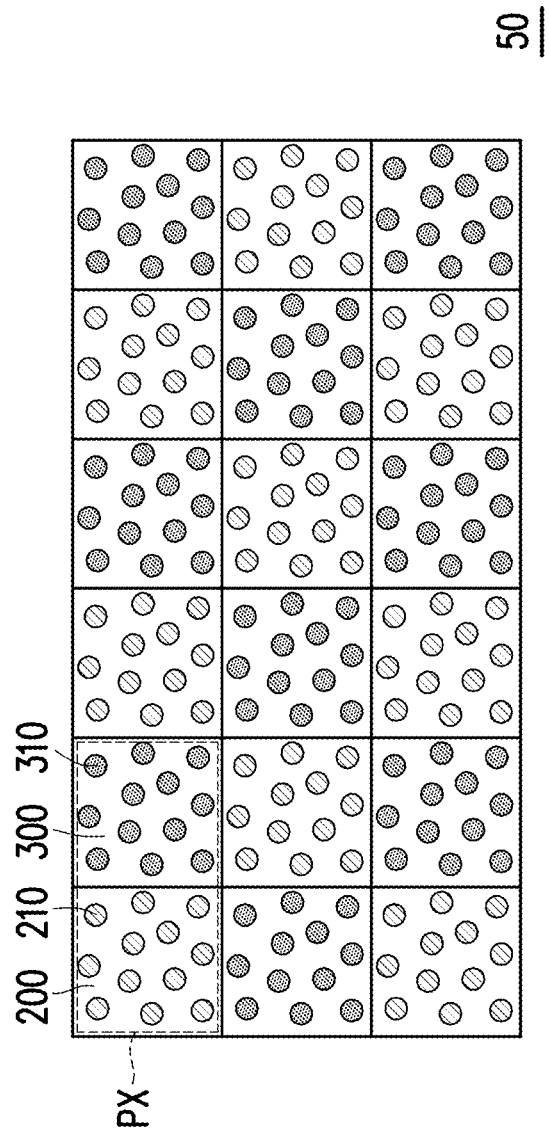
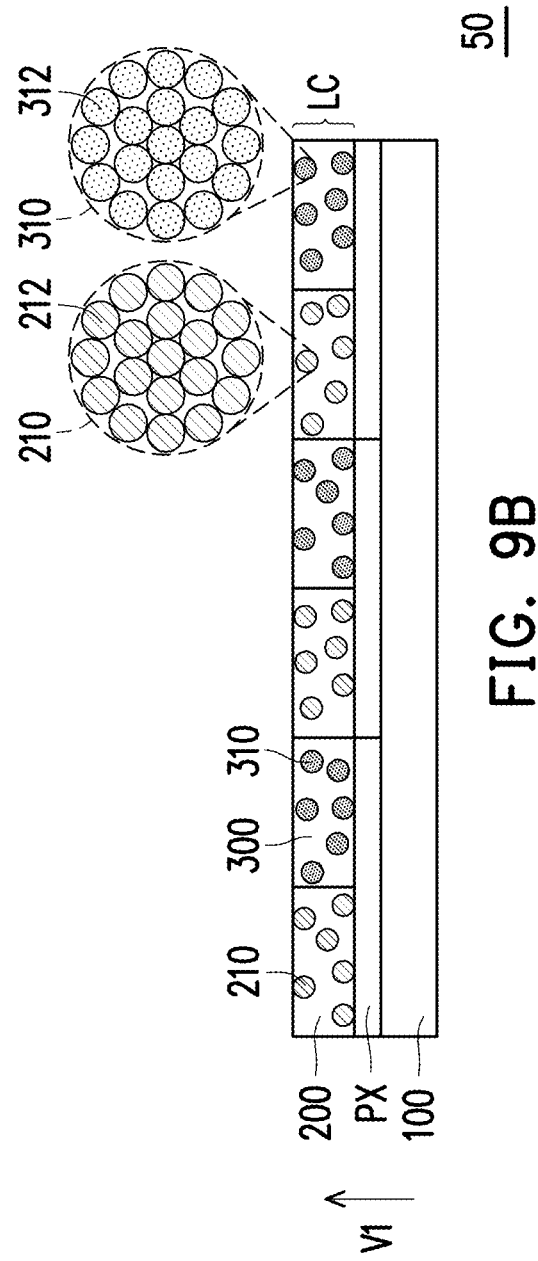
FIG. 9A
FIG. 9B

LIQUID CRYSTAL PANEL

CROSS-REFERENCE TO RELATED APPLICATION

This application claims the priority benefit of Taiwan application Ser. No. 108116225, filed on May 10, 2019. The entirety of the above-mentioned patent application is hereby incorporated by reference herein and made a part of this specification.

BACKGROUND OF THE INVENTION

Field of the Invention

The disclosure generally relates to a liquid crystal panel, in particular, to a liquid crystal panel with a display medium layer including multiple first liquid crystal molecules and multiple second liquid crystal molecules.

Description of Related Art

A liquid crystal display device has the advantages of light and thin volume, low radiation performance and the like, thus the liquid crystal display device occupies an important position on the market. In use of the liquid crystal display device, a user not always looks at the liquid crystal display device at a front view angle, and the user may look at a liquid crystal display at different viewing angles. However, when the viewing angle at which the user looks at the liquid crystal display device increases, the contrast ratio of the liquid crystal display device sensed by the user may be lowered, and therefore the viewing angle of the liquid crystal display device is limited.

Thus, how to still keep better display quality of the liquid crystal display under different viewing angles is one of topics which the industry is dedicated to currently.

SUMMARY OF THE INVENTION

The invention is directed to a liquid crystal panel, and the problem that the viewing angle of the liquid crystal panel is limited can be solved.

At least one embodiment of the invention provides a liquid crystal display panel. The liquid crystal display panel includes a substrate and a display medium layer. The display medium layer is located on the substrate. The display medium layer includes multiple first liquid crystal capsules and multiple second liquid crystal capsules. Each of the first liquid crystal capsules includes multiple first liquid crystal molecules. A dielectric anisotropy Δε of the first liquid crystal molecules is greater than 0. A refractive index of the first liquid crystal capsules on the z-axis is greater than a refractive index of the first liquid crystal capsules on the x-axis and a refractive index of the first liquid crystal capsules on the y-axis. Each of the second liquid crystal capsules includes multiple second liquid crystal molecules. A dielectric anisotropy Δε of the second liquid crystal molecules is greater than 0. A refractive index of the second liquid crystal capsules on the z-axis is smaller than a refractive index of the second liquid crystal capsules on the x-axis and the refractive index of the second liquid crystal capsules on the y-axis.

In order to make the aforementioned and other objectives and advantages of the invention comprehensible, embodiments accompanied with figures are described in detail below.

BRIEF DESCRIPTION OF THE DRAWINGS

FIG. 9A is a top view of a liquid crystal panel according to an embodiment of the invention.

FIG. 9B is a cross-sectional view of a liquid crystal panel according to an embodiment of the invention.

DESCRIPTION OF THE EMBODIMENTS

Figure 1:
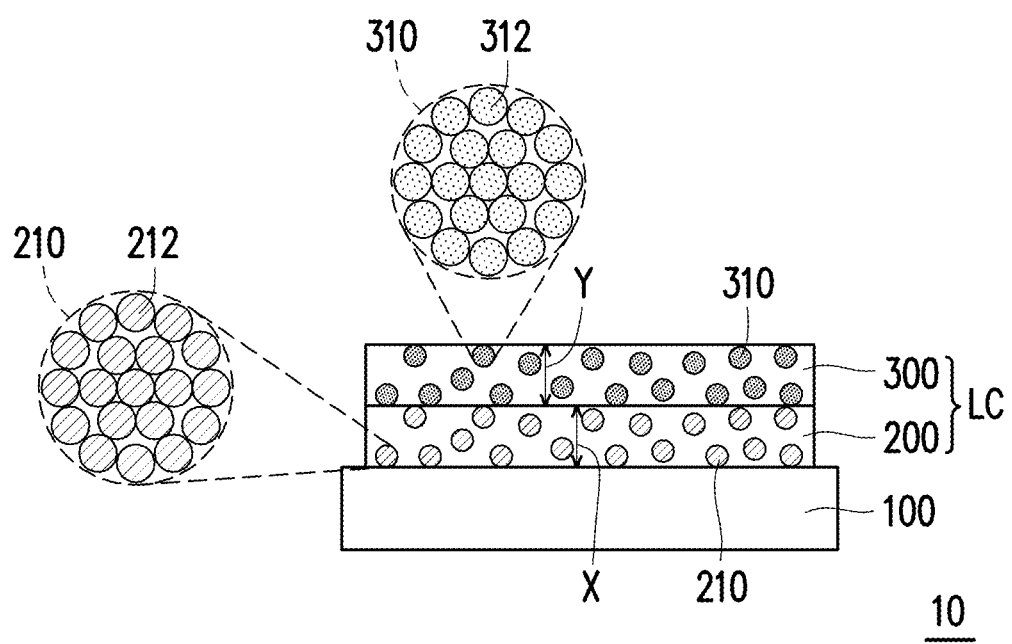
FIG. 1 is a cross-sectional view of a liquid crystal panel according to an embodiment of the invention.

FIG. 1 is a cross-sectional view of a liquid crystal panel according to an embodiment of the invention.

Referring to FIG. 1, a liquid crystal display panel 10 includes a substrate 100 and a display medium layer LC. The display medium layer LC is disposed on the substrate 100. The display medium layer LC includes multiple first liquid crystal molecules 212 and multiple second liquid crystal molecules 312.

In the present embodiment, the display medium layer LC includes a first liquid crystal layer 200 and a second liquid crystal layer 300, the first liquid crystal molecules 212 are disposed in the first liquid crystal layer 200, and the second liquid crystal molecules 312 are disposed in the second liquid crystal layer 300. In the present embodiment, the first liquid crystal layer 200 is disposed between the second liquid crystal layer 300 and the substrate 100, but the invention is not limited thereto. In other embodiments, the second liquid crystal layer 300 is disposed between the first liquid crystal layer 200 and the substrate 100. In some embodiments, the first liquid crystal layer 200 further includes other display media in addition to the first liquid crystal molecules 212, but the invention is not limited thereto. In some embodiments, the second liquid crystal layer 300 further includes other display media in addition to the second liquid crystal molecules 312, but the invention is not limited thereto. In other words, the display medium layer LC can also include other display media in addition to the first liquid crystal molecules 212 and the second liquid crystal molecules 312.

In the present embodiment, the first liquid crystal molecules 212 are gathered into multiple first liquid crystal capsules 210, and the second liquid crystal molecules 312 are gathered into multiple second liquid crystal capsules 310. In other words, the display medium layer LC includes the multiple first liquid crystal capsules 210 and the multiple second liquid crystal capsules 310, each of the first liquid crystal capsules 210 includes the multiple first liquid crystal molecules 212, and each of the second liquid crystal capsules 310 includes the multiple second liquid crystal molecules 312. The sizes of the first liquid crystal capsules 210 and the second liquid crystal capsules 310 are, for example, about 100 nanometers to 400 nanometers. In the present embodiment, the display medium layer LC is, for example, nematic liquid crystals.

Figure 2B:
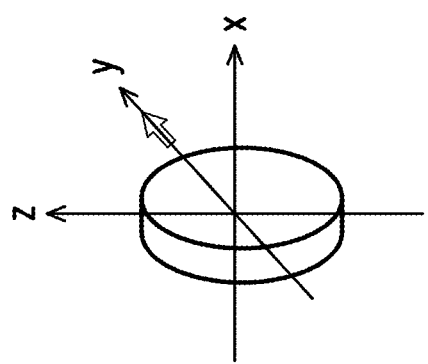
FIG. 2B is a schematic view of the refractive index of a first liquid crystal layer according to an embodiment of the invention on different direction axes.
Figure 2A:
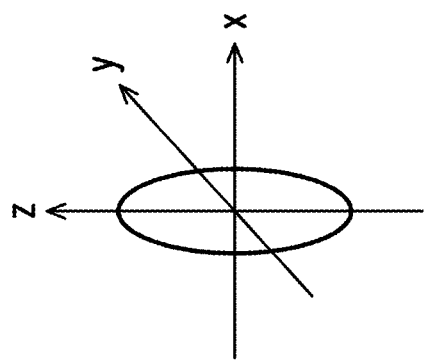
FIG. 2A is a schematic view of the refractive index of a first liquid crystal layer according to an embodiment of the invention on different direction axes.

FIG. 2A is a schematic view of the refractive index of a first liquid crystal layer according to an embodiment of the invention on different direction axes when an electric field is not applied. FIG. 2B is a schematic view of the refractive index of the first liquid crystal layer according to an embodiment of the invention on different direction axes after the electric field is applied. In FIG. 2B, the direction of the electric field applied to the first liquid crystal layer is parallel with the y-axis.

Referring to FIG. 2A, when the electric field is not applied, the refractive index of the first liquid crystal layer on the z-axis is greater than the refractive index of the first liquid crystal layer on the x-axis and the refractive index of the first liquid crystal layer 200 on the y-axis. For example, the refractive index of the first liquid crystal layer 200 on the x-axis is equal to the refractive index of the first liquid crystal layer 200 on the y-axis.

Referring to FIG. 2B, after the electric field parallel with the y-axis is applied to the first liquid crystal layer 200, the refractive index of the first liquid crystal layer 200 on the y-axis can be increased, and the refractive index of the first liquid crystal layer 200 on the x-axis and the refractive index of the first liquid crystal layer 200 on the z-axis can be decreased.

What is worth noting is that, FIG. 2A and FIG. 2B are only used for showing changing of the refractive index of the first liquid crystal layer 200 on different direction axes after the electric field is applied, and cannot be used for interpreting an actual numerical value of the refractive index.

Referring to FIG. 1, the refractive index of the first liquid crystal layer 200 is about equal to the refractive index of the first liquid crystal capsules 210. The dielectric anisotropy $\Delta\varepsilon$ of the first liquid crystal capsules 210 is greater than 0. In the invention, the refractive index of the first liquid crystal layer 200 on the z-axis is greater than the refractive index of the first liquid crystal layer 200 on the x-axis and the refractive index of the first liquid crystal layer 200 on the y-axis. The refractive index of the first liquid crystal capsules 210 on the z-axis is greater than the refractive index of the first liquid crystal capsules 210 on the x-axis and the refractive index of the first liquid crystal capsules 210 on the y-axis. The refractive index of a film layer composed of the multiple first liquid crystal capsules 210 is measured so as to obtain the refractive index of the first liquid crystal capsules 210. In the present embodiment, the first liquid crystal molecules 212 in the first liquid crystal capsules 210 can be called C+ type liquid crystal molecules. In some embodiments, the first liquid crystal molecules 212 are long-strip liquid crystal molecules which are prone to be mutually stacked, but the invention is not limited thereto.

In the present embodiment, part of the first liquid crystal molecules 212 are represented by following Chemical Formula 1:

[Chemical Formula 1]

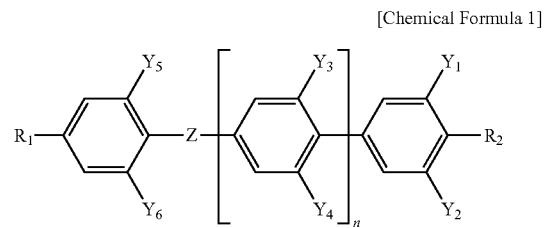

In Chemical Formula 1, R1 and R2 are each independently hydrogen, halogen or an alkyl group having 1 to 20 carbon atoms, one —$CH_2$— in the alkyl group having 1 to 20 carbon atoms is substituted or unsubstituted by —O—, —S— or —CH=CH—, hydrogen in the alkyl group having 1 to 20 carbon atoms is substituted or unsubstituted by fluorine, where $Y_1$, $Y_2$, $Y_3$, $Y_4$, $Y_5$ and $Y_6$ are each independently hydrogen or fluorine, where Z is —$CH_2$—, —$CH_2$—$CH_2$—, —$(CH_2)_3$—, —$CH_2$=$CH_2$—, —COO—, —OOC—$CF_2O$—, —$OCH_2$—, —$CH_2O$—, $OCF_2$—, —CH≡CH— or a single bond, and n is greater than or equal to 1. In some embodiments, 40 wt % of the first liquid crystal molecules 212 are represented by Chemical Formula 1.

Figure 3B:
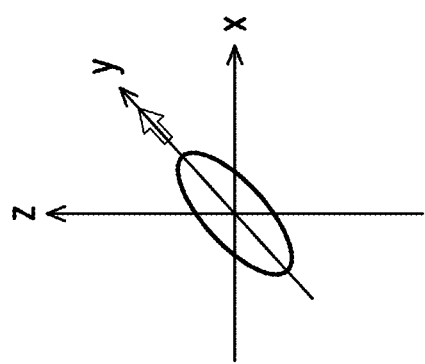
FIG. 3B is a schematic view of the refractive index of a second liquid crystal layer according to an embodiment of the invention on different direction axes.
Figure 3A:
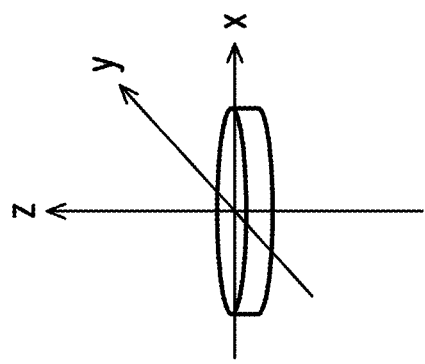
FIG. 3A is a schematic view of the refractive index of a second liquid crystal layer according to an embodiment of the invention on different direction axes.

FIG. 3A is a schematic view of the refractive index of a second liquid crystal layer according to an embodiment of the invention on different direction axes when an electric field is not applied. FIG. 3B is a schematic view of the refractive index of the second liquid crystal layer according to an embodiment of the invention on different direction axes after the electric field is applied. In FIG. 3B, the direction of the electric field applied to the second liquid crystal layer is parallel with the y-axis.

Referring to FIG. 3A, when the electric field is not applied, the refractive index of the second liquid crystal layer 300 on the z-axis is smaller than the refractive index of the second liquid crystal layer 300 on the x-axis and the refractive index of the second liquid crystal layer 300 on the y-axis. For example, the refractive index of the second liquid crystal layer 300 on the x-axis is equal to the refractive index of the second liquid crystal layer 300 on the y-axis.

Referring to FIG. 3B, after the electric field parallel with the y-axis is applied to the second liquid crystal layer 300, the refractive index of the second liquid crystal layer 300 on the y-axis can be increased, and the refractive index of the second liquid crystal layer on the x-axis and the refractive index of the second liquid crystal layer on the z-axis can be decreased.

What is worth noting is that, FIG. 3A and FIG. 3B are only used for showing changing of the refractive index of the second liquid crystal layer 300 on different direction axes after the electric field is applied, and cannot be used for interpreting an actual numerical value of the refractive index.

Referring to FIG. 1, the refractive index of the second liquid crystal layer 300 is about equal to the refractive index of the second liquid crystal capsules 310. The dielectric anisotropy Δε of the second liquid crystal molecules 312 is greater than 0. In the invention, the refractive index of the second liquid crystal layer 300 on the z-axis is smaller than the refractive index of the second liquid crystal layer 300 on the x-axis and the refractive index of the second liquid crystal layer 300 on the y-axis. The refractive index of the second liquid crystal capsules 310 on the z-axis is smaller than the refractive index of the second liquid crystal capsules 310 on the x-axis and the refractive index of the second liquid crystal capsules 310 on the y-axis. The refractive index of a film layer composed of the multiple second liquid crystal capsules 310 is measured so as to obtain the refractive index of the second liquid crystal capsules 310. In the present embodiment, the second liquid crystal molecules 312 in the second liquid crystal capsules 310 can also be called C-type liquid crystal molecules. In some embodiments, the shape of the second liquid crystal molecules 312 may be unfavorable for mutual stacking, but the invention is not limited thereto.

In the present embodiment, part of the second liquid crystal molecules 312 are represented by Chemical Formula 2 or Chemical Formula 3 below:

[Chemical Formula 2]

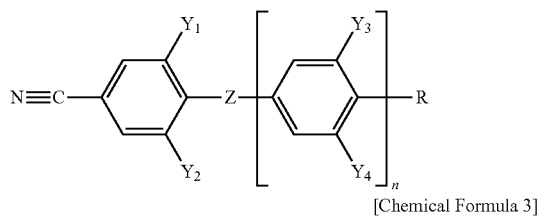

[Chemical Formula 3]

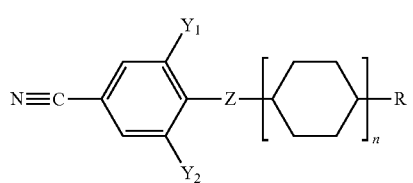

In Chemical Formula 2 and Chemical Formula 3, R is hydrogen, halogen or an alkyl group having 1 to 20 carbon atoms, one —$CH_2$— in the alkyl group having 1 to 20 carbon atoms is substituted or unsubstituted by —O—, —S— or —CH=CH—, and hydrogen in the alkyl group having 1 to 20 carbon atoms is substituted or unsubstituted by fluorine, where $Y_1$, $Y_2$, $Y_3$ and $Y_4$ are each independently hydrogen or fluorine, where Z is —$CH_2$—, —$CH_2$—$CH_2$—, —$(CH_2)_3$—, —$CH_2$=$CH_2$—, —COO—, —OOC—$CF_2O$—, —$OCH_2$—, —$CH_2O$—, OCF2—. —CH≡CH—or a single bond, and n is greater than or equal to 1. In some embodiments, 40 wt % of the second liquid crystal molecules 312 are represented by Chemical Formula 2 or Chemical Formula 3. In some embodiments, part of the second liquid crystal molecules 312 are represented by Chemical Formula 2, and part of the second liquid crystal molecules 312 are represented by Chemical Formula 3.

When the first liquid crystal molecules 212 or the second liquid crystal molecules 312 are independently used as the display medium layer of the liquid crystal panel, great brightness is achieved respectively under different viewing angles. For example, when the first liquid crystal molecules 212 serve as the display medium layer of the liquid crystal panel, brightness is high when the viewing angle is 0 degrees and 180 degrees, and when the second liquid crystal molecules 312 serve as the display medium layer of the liquid crystal panel, brightness is high when the viewing angle is 90 degrees and 270 degrees. Thus, the display medium layer LC of the present embodiment includes the first liquid crystal molecules 212 and the second liquid crystal molecules 312 at the same time, and the liquid crystal panel 10 has high brightness under the different viewing angles.

In the present embodiment, the optical axis direction of the first liquid crystal layer 200 is the same as the optical axis direction of the second liquid crystal layer 300. For example, the optical axis directions are both the same as the electric field direction. In other words, the optical axis direction of the first liquid crystal capsules 210 is the same as the optical axis direction of the second liquid crystal capsules 310. Compared with positive type liquid crystals (the dielectric anisotropy Δε is greater than 0) and negative type liquid crystals (the dielectric anisotropy Δε is smaller than 0) which have mixed optical axis directions perpendicular to each other, optical retardation effects of the first liquid crystal layer 200 and the second liquid crystal layer 300 in the display medium layer LC of the present embodiment are not mutually offset, so that the display medium layer LC of the present embodiment has a higher front view penetration rate.

Figure 10A:
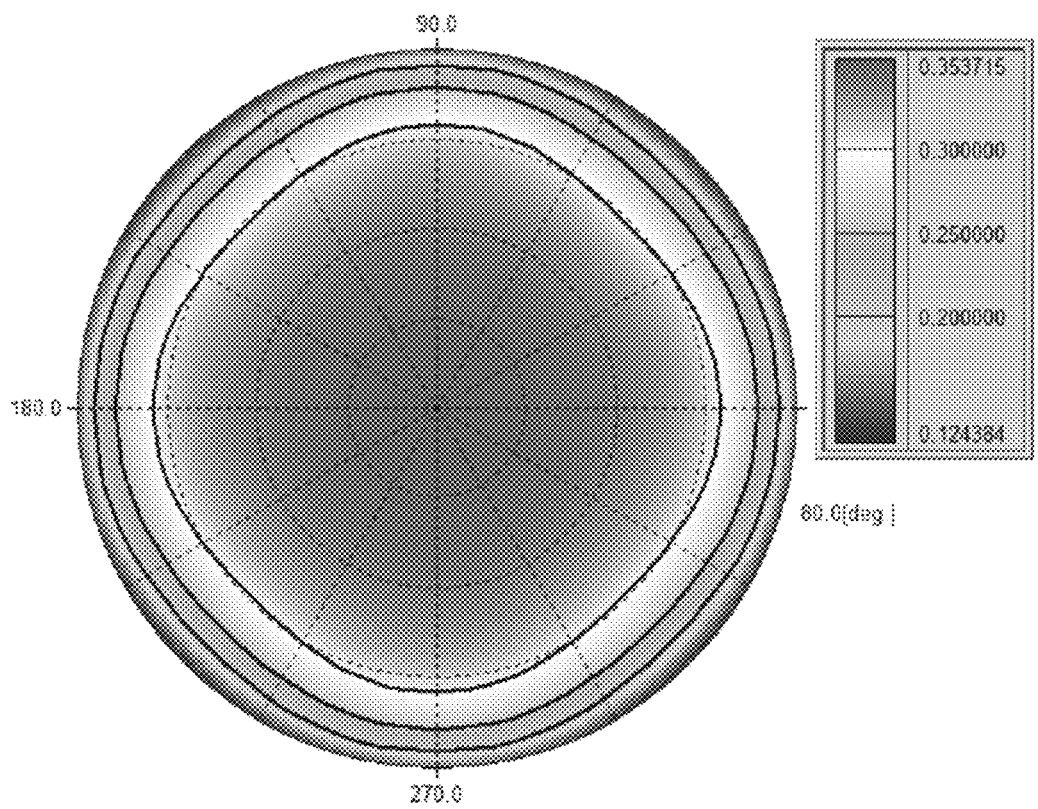
FIG. 10A is a viewing angle penetration rate simulated view of a liquid crystal display device including the liquid crystal panel of an embodiment of the invention.
Figure 10B:
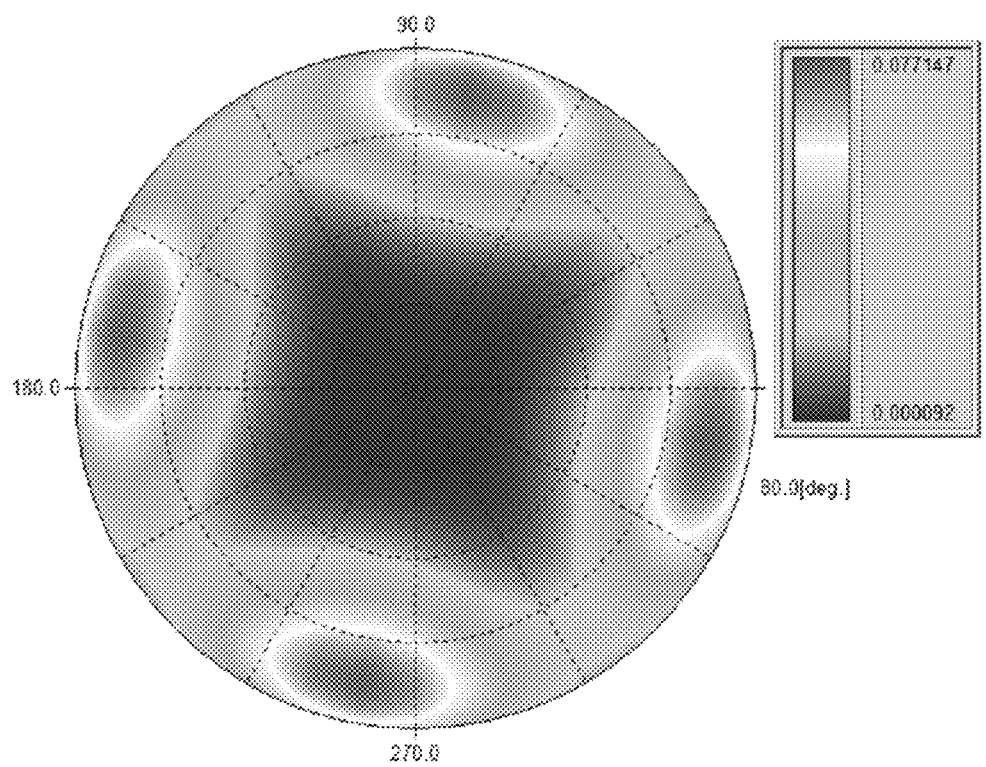
FIG. 10B is a viewing angle penetration rate simulated view of a liquid crystal display device with a display medium layer including positive type liquid crystals and negative type liquid crystals.

For example, FIG. 10A is a viewing angle penetration rate simulated view of a liquid crystal display device using the liquid crystal panel 10. FIG. 10B is a viewing angle penetration rate simulated view of a liquid crystal display device with a display medium layer including positive type liquid crystals and negative type liquid crystals. It can be found that by comparing FIG. 10A and FIG. 10B, the liquid crystal display device using the liquid crystal panel 10 has a higher penetration rate.

In some embodiments, the liquid crystal display panel 10 further includes an opposed substrate (not drawn), and the display medium layer LC is disposed between the substrate 100 and the opposed substrate. For example, an electrode is arranged on the substrate 100 or on the substrate 100 and the opposed substrate, so that an electric field is generated between the substrate 100 and the opposed substrate, and the first liquid crystal molecules 212 and the second liquid crystal molecules 312 in the display medium layer LC are controlled. The electrode arrangement can be determined according to the actual requirement. For example, the present embodiment is applicable to the in-plane switching technology (IPS), the fringe-field switching technology (FFS), the fringe and in-plane field switching technology (FIS) or other display technologies.

FIG. 4A to FIG. 4D are schematic views of a phase retardation value of a liquid crystal layer measured according to the invention.

By measuring the phase retardation value of the first liquid crystal layer and the second liquid crystal layer in the display medium layer in different directions, the thickness of the first liquid crystal layer and the thickness of the second liquid crystal layer are determined.

Figure 4A:
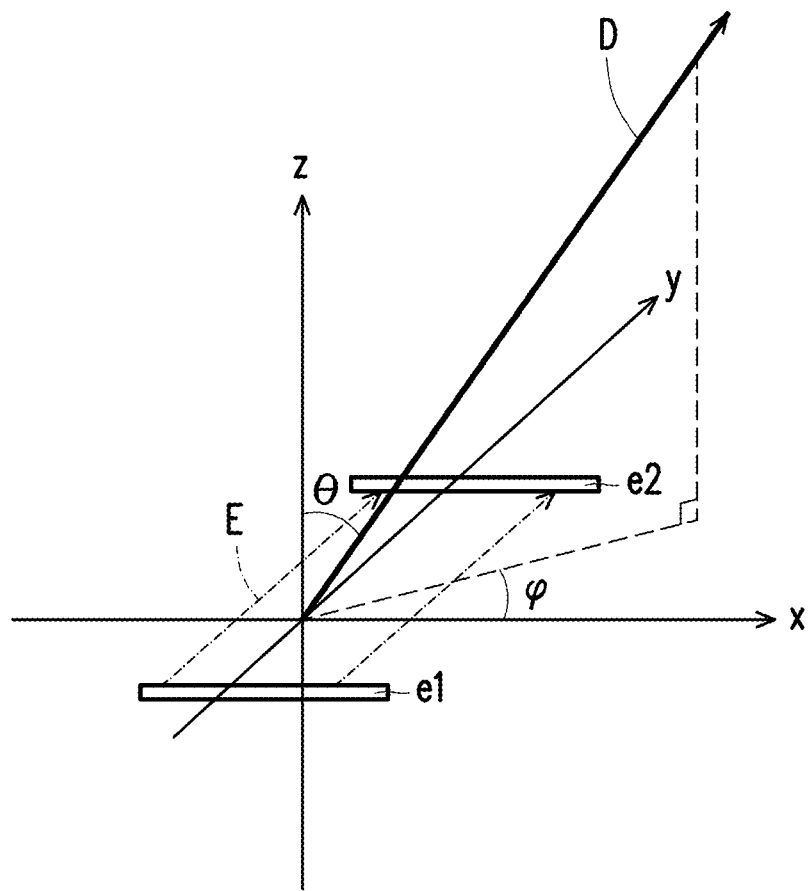
FIG. 4A to FIG. 4D are schematic views of a phase retardation value of a liquid crystal layer measured according to the invention.

Referring to FIG. 4A, an electrode e1 and an electrode e2 are provided, an electric field E is formed in the display medium layer, and the direction of the electric field E is parallel with the y-axis. The first liquid crystal layer or the second liquid crystal layer is disposed between the electrode e1 and the electrode e2.

The phase retardation value of the first liquid crystal layer or the second liquid crystal layer in a direction D is measured. An included angle θ exists between the direction D and the z-axis, and an included angle φ exists between the projection of the direction D on a plane formed by the x-axis and the y-axis and the x-axis.

Figure 4B:
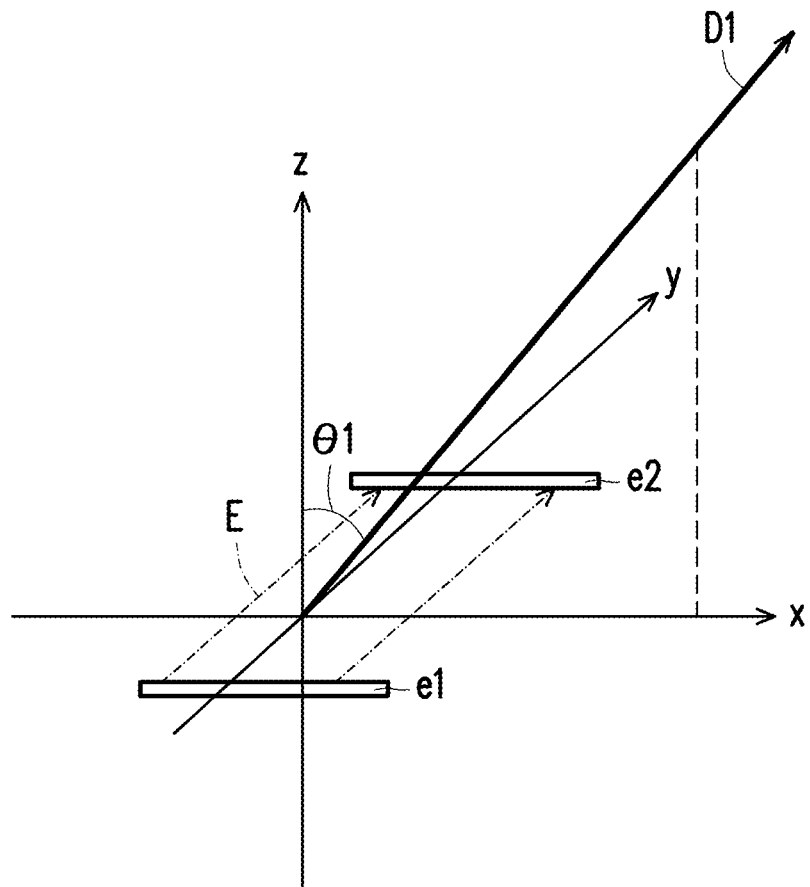
Figure 4C:
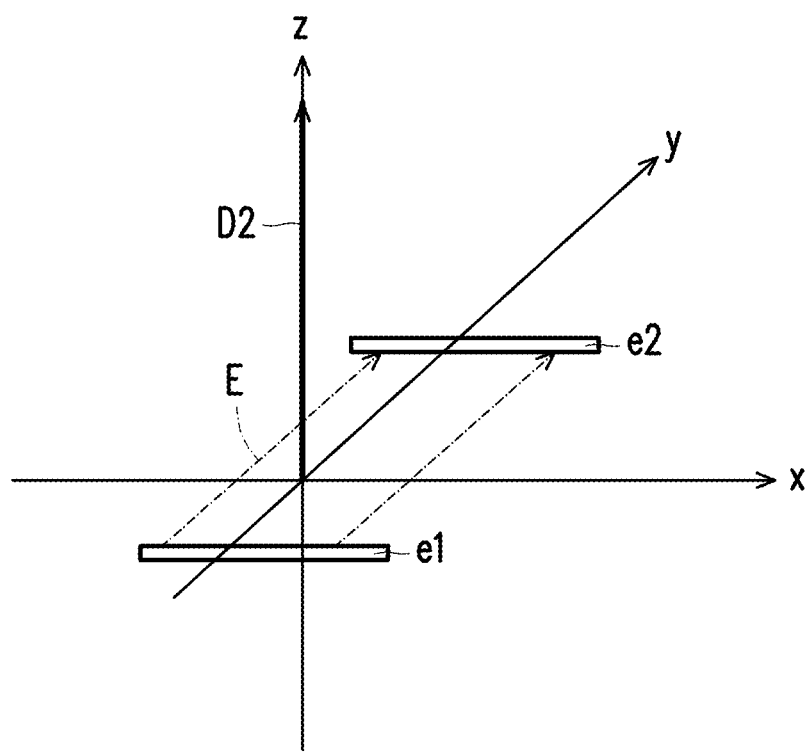
Figure 4D:
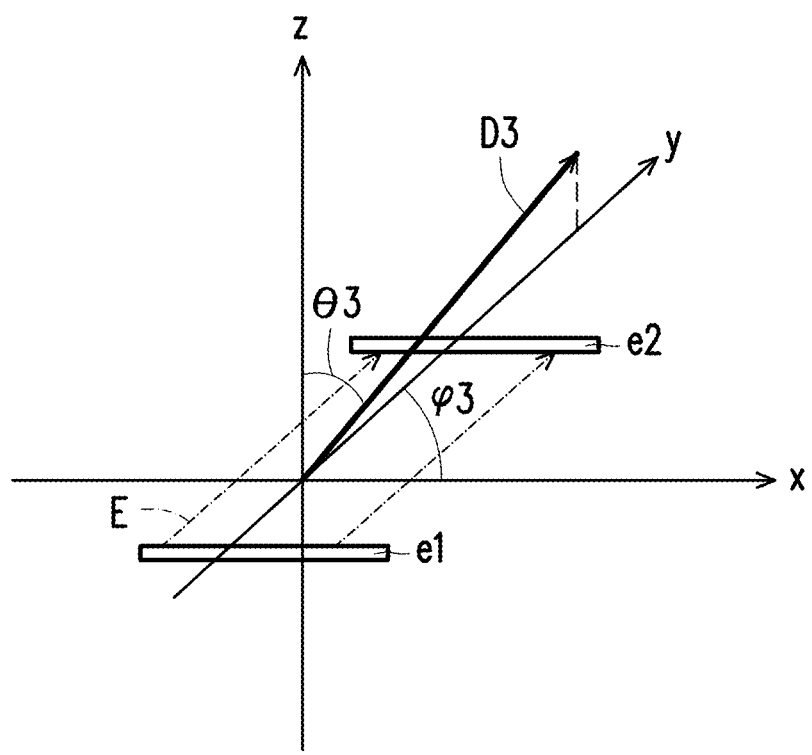

Referring to FIG. 4B to FIG. 4D, the phase retardation values of the first liquid crystal layer in a first direction D1, a second direction D2 and a third direction D3 are respectively measured, and then are divided by the thickness of the first liquid crystal layer used during measuring, so that phase retardation values per unit thickness of the first liquid crystal layer in the first direction D1, the second direction D2 and the third direction D3 are obtained.

The phase retardation value per unit thickness of the first liquid crystal layer in the first direction D1 is $a_{+1}$, the phase retardation value per unit thickness of the first liquid crystal layer in the second direction D2 is $a_{+2}$, and the phase retardation value per unit thickness of the first liquid crystal layer in the third direction D3 is $a_{+3}$.

The phase retardation values of the second liquid crystal layer in the first direction D1, the second direction D2 and the third direction D3 are respectively measured, and then are divided by the thickness of the second liquid crystal layer used during measuring, so that phase retardation values per unit thickness of the second liquid crystal layer in the first direction D1, the second direction D2 and the third direction D3 are obtained.

The phase retardation value per unit thickness of the second liquid crystal layer in the first direction D1 is $a_{-1}$, the phase retardation value per unit thickness of the second liquid crystal layer in the second direction D2 is $a_{-2}$, and the phase retardation value per unit thickness of the second liquid crystal layer in the third direction D3 is $a_{-3}$.

Referring to FIG. 1, assuming that the thickness of the first liquid crystal layer 200 is X, and the thickness of the second liquid crystal layer 300 is Y, in order to make the phase retardation values of the display medium layer LC in the first direction D1, the second direction D2 and the third direction D3 all close to or equal to λ/2 Formula 1, Formula 2 and Formula 3 below can be obtained:

$$a_{+1}X + a_{-1}Y \approx \lambda/2 \quad [\text{Formula 1}]$$

$$a_{+2}X + a_{-2}Y = \lambda/2 \quad [\text{Formula 2}]$$

$$a_{+3}X + a_{-3}Y \approx \lambda/2 \quad [\text{Formula 3}]$$

Formula 2 is subtracted from Formula 1 so as to obtain following Formula 4:

$$A_1X + B_1Y \approx 0 \quad [\text{Formula 4}]$$

where $A_1$ is $a_{+1} - a_{+2}$, and $B_1$ is $a_{-1} - a_{-2}$.

Formula 2 is subtracted from Formula 3 so as to obtain following Formula 5:

$$A_2X + B_2Y \approx 0 \quad [\text{Formula 5}]$$

where $A_2$ is $a_{+3} - a_{+2}$, and $B_2$ is $a_{-3} - a_{-2}$.

The square of Formula 4 and the square of Formula 5 are then added so as to obtain following Formula 6:

$$(A_1X + B_1Y)^2 + (A_2X + B_2Y)^2 \approx 0 \quad [\text{Formula 6}]$$

The minimum solution of Formula 6 is obtained so as to obtain following Formula 7:

$$Y = (R - PX)/Q \quad [\text{Formula 7}]$$

Formula 7 is brought back to Formula 6 so as to obtain following Formula 8:

$$X = -(E_1F_1 + E_2F_2)/E_1^2 + E_2^2 \quad [\text{Formula 8}]$$

In Formula 8, $E_1$ is $A_1 - ((B_1P)/Q)$, $E_2$ is $A_2 - ((B_2P)/Q)$, $F_1$ is $(B_1R)/Q$, and $F_2$ is $(B_2R)/Q$.

After X and Y values are obtained by means of the above Formulae 7 and 8, when the thickness of the first liquid crystal layer is 1.1X micrometers to 0.9X micrometers (preferably 1.065X micrometers to 0.935X micrometers), and the thickness of the second liquid crystal layer is 1.1Y micrometers to 0.9Y micrometers (preferably 1.065Y micrometers to 0.935Y micrometers), the problem that the viewing angle of the liquid crystal panel is limited can be solved. When the thickness of the first liquid crystal layer is 1.065X micrometers to 0.935X micrometers, and the thickness of the second liquid crystal layer is 1.065Y micrometers to 0.935Y micrometers, the problem that the viewing angle of the liquid crystal panel is limited can be further solved.

For example, an included angle θ1 between the first direction D1 and the z-axis is 30 degrees to 50 degrees, an included angle φ1 between the projection of the first direction D1 on the plane formed by the x-axis and the y-axis and the x-axis is −10 degrees to 10 degrees, an included angle θ2 between the second direction D2 and the z-axis is −10 degrees to 10 degrees, an included angle φ2 between the projection of the second direction D2 on the plane formed by the x-axis and the y-axis and the x-axis is −10 degrees to 10 degrees, an included angle θ3 between the third direction D3 and the z-axis is 30 degrees to 50 degrees, and an included angle φ3 between the projection of the third direction D3 on the plane formed by the x-axis and the y-axis and the x-axis is 80 degrees to 100 degrees. The phase retardation values $a_{+1}$, $a_{+2}$ and $a_{+3}$ of a unit thickness of the first liquid crystal layer are respectively 0.1418, 0.1455 and 0.1508, and the phase retardation values $a_{-1}$, $a_{-2}$ and $a_{-3}$ of a unit thickness of the second liquid crystal layer are respectively 0.1265, 0.108 and 0.0891. It can be calculated that X is 1.716 and Y is 0.415 by means of the above-mentioned Formulae 1 to 8.

In the present embodiment, an included angle θ between the first direction D1 and the z-axis is 40 degrees, an included angle φ1 between the projection of the first direction D1 on the plane formed by the x-axis and the y-axis and the x-axis is 0 degrees, an included angle θ2 between the second direction D2 and the z-axis is 0 degrees, an included angle φ2 between the projection of the second direction D2 on the plane formed by the x-axis and the y-axis and the x-axis is 0 degrees, an included angle θ3 between the third direction D3 and the z-axis is 40 degrees, and an included angle φ3 between the projection of the third direction D3 on the plane formed by the x-axis and the y-axis and the x-axis is 90 degrees.

In the present embodiment, the symmetry (symmetrical about an original point) of the directions is considered, and the first direction D1, the second direction D2 and the third direction D3 can be reversed.

For example, the included angle θ between the first direction D1 and the z-axis is 40 degrees, and the included angle φ1 between the projection of the first direction D1 on the plane formed by the x-axis and the y-axis and the x-axis is 0 degrees or 180 degrees.

The included angle θ2 between the second direction D2 and the z-axis is 0 degrees, and the included angle φ2 (not shown) between the projection of the second direction D2 on the plane formed by the x-axis and the y-axis and the x-axis is 0 degrees. In other words, the second direction D2 is the same as or opposite to the direction of the z-axis.

The included angle θ3 between the third direction D3 and the z-axis is 40 degrees, and the included angle φ3 between the projection of the third direction D3 on the plane formed by the x-axis and the y-axis and the x-axis is 90 degrees or 270 degrees.

FIG. 5A to FIG. 5D are cross-sectional views of a manufacturing method of a liquid crystal panel according to an embodiment of the invention. What should be explained herein is that the embodiment of FIG. 5A to FIG. 5D uses the element numerals and part of the content of the embodiments of FIG. 1 to FIG. 4D, wherein the same or similar numerals are adopted for showing the same or similar elements, and the description of the same technical content is omitted. Reference may be made to the above-mentioned embodiments for descriptions of the omitted part, which will not be repeatedly described herein.

Figure 5A:
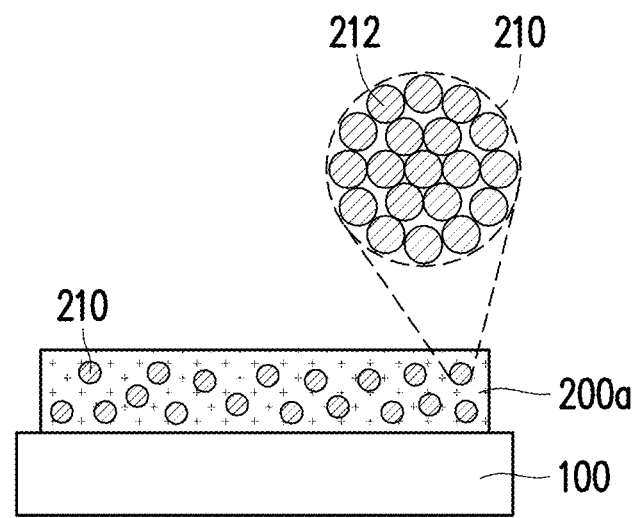
FIG. 5A to FIG. 5D are cross-sectional views of a manufacturing method of a liquid crystal panel according to an embodiment of the invention.

Referring to FIG. 5A, on the substrate 100, a first liquid crystal molecular material layer 200a is formed. In the first liquid crystal molecular material layer 200a, the multiple first liquid crystal capsules 210, a solvent and other display media are included.

Figure 5B:
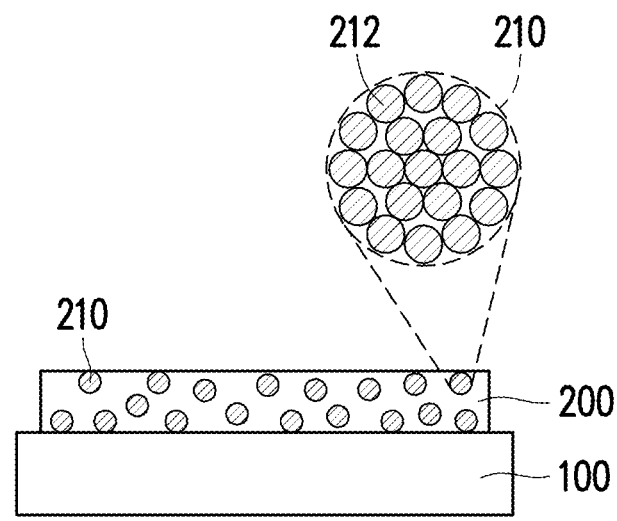

Referring to FIG. 5B, the solvent in the first liquid crystal molecular material layer 200a is removed in the baking process, so that the first liquid crystal layer 200 is obtained.

Figure 5C:
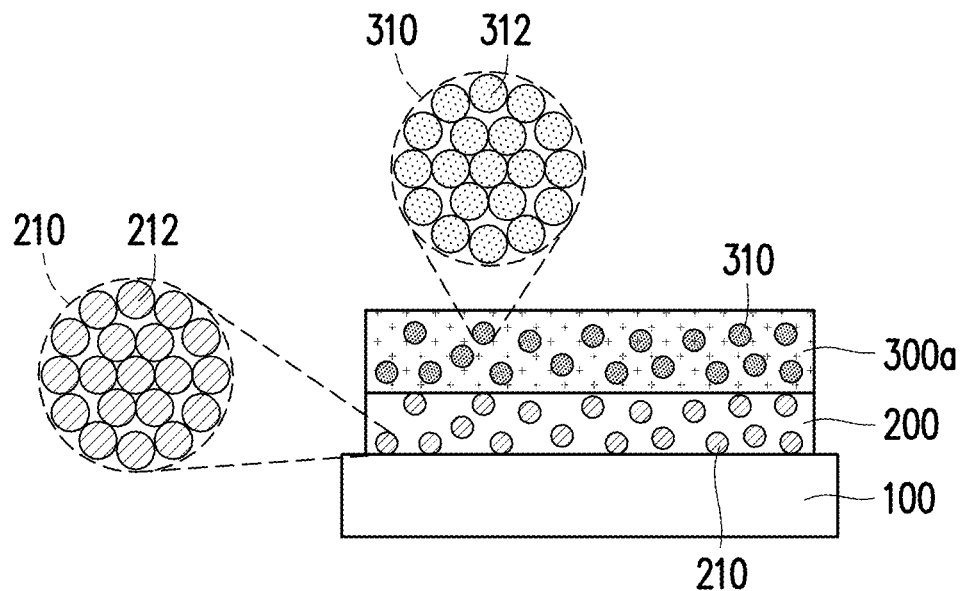

Referring to FIG. 5C, on the first liquid crystal layer 200, a second liquid crystal molecular material layer 300a is formed. In the second liquid crystal molecular material layer 300a, the multiple second liquid crystal capsules 310, a solvent and other display media are included.

Figure 5D:
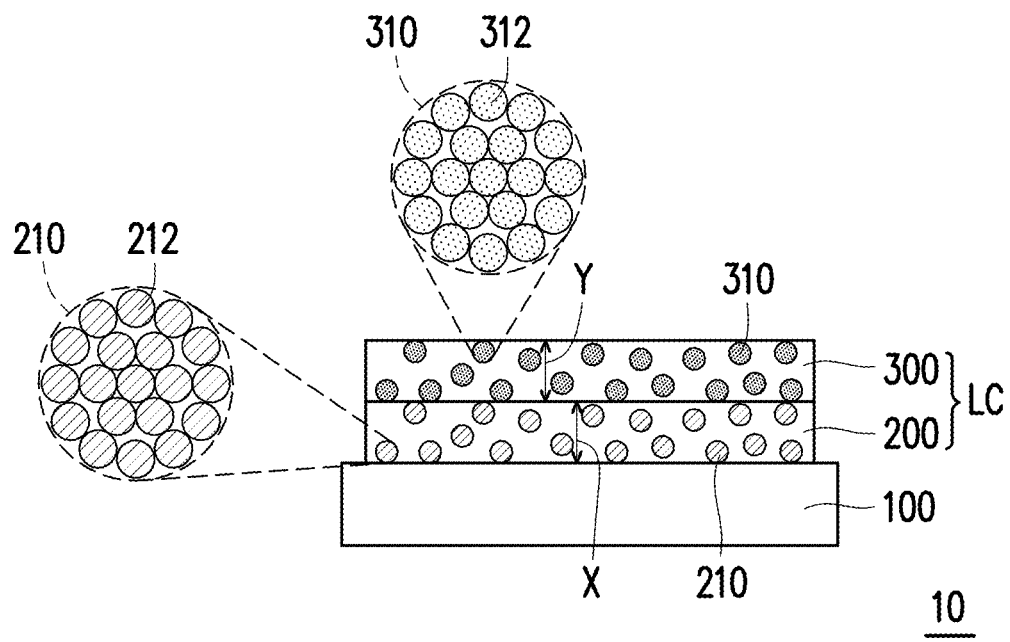

Referring to FIG. 5D, the solvent in the second liquid crystal molecular material layer 300a is removed in the baking process, so that the second liquid crystal layer 300 is obtained. The display medium layer LC includes the first liquid crystal layer 200 and the second liquid crystal layer 300. So far, the liquid crystal panel 10 is roughly completed.

Figure 6A:
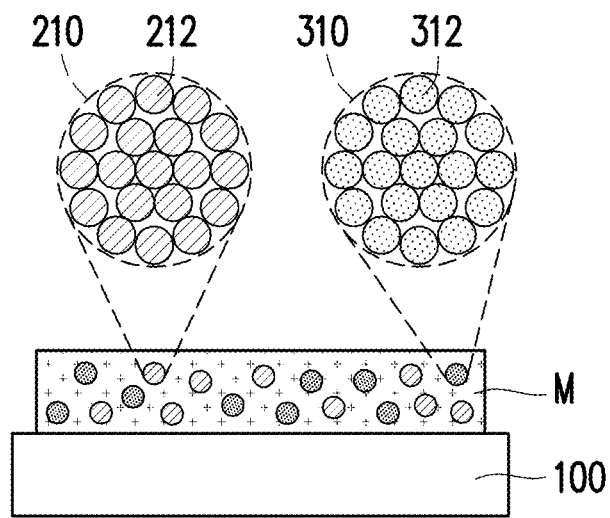
FIG. 6A and FIG. 6B are cross-sectional views of a manufacturing method of a liquid crystal panel according to an embodiment of the invention.
Figure 6B:
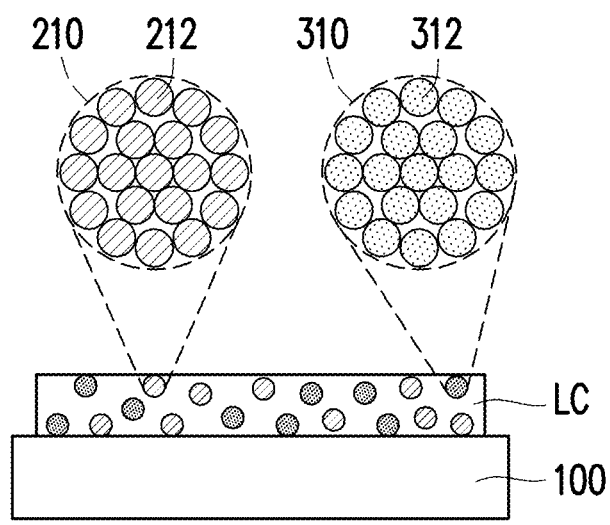

FIG. 6A and FIG. 6B are cross-sectional views of a manufacturing method of a liquid crystal panel according to an embodiment of the invention. What should be explained herein is that, the embodiment of FIG. 6A and FIG. 6B uses the element numerals and part of the content of the embodiment of FIG. 5A to FIG. 5D, wherein the same or similar numerals are adopted for showing the same or similar elements, and the description of the same technical content is omitted. Reference may be made to the above-mentioned embodiment for descriptions of the omitted part, which will not be repeatedly described herein.

Referring to FIG. 6A, on the substrate 100, a liquid crystal molecular material layer M is formed. In the liquid crystal molecular material layer M, the multiple first liquid crystal capsules 210, the multiple second liquid crystal capsules 310, a solvent and other display media are included.

Referring to FIG. 6B, the solvent in the first liquid crystal molecular material layer 200a is removed in the baking process, so that the display medium layer LC is obtained. So far, a liquid crystal panel 20 is roughly completed.

The display medium layer LC includes the first liquid crystal capsules 210 and the second liquid crystal capsules 310. The first liquid crystal capsules 210 and the second liquid crystal capsules 310 are uniformly distributed in the display medium layer LC.

Figure 7A:
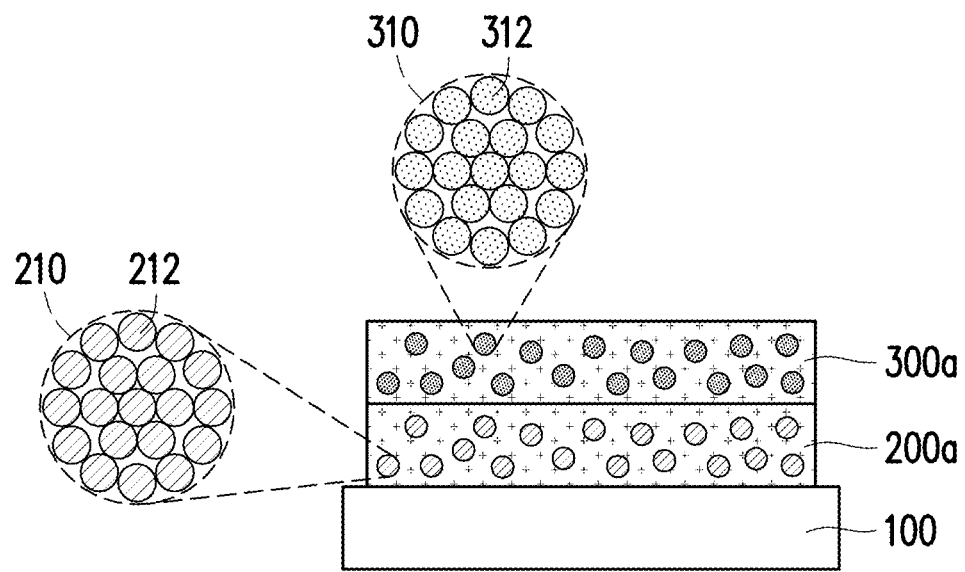
FIG. 7A to FIG. 7C are cross-sectional views of a manufacturing method of a liquid crystal panel according to an embodiment of the invention.
Figure 7B:
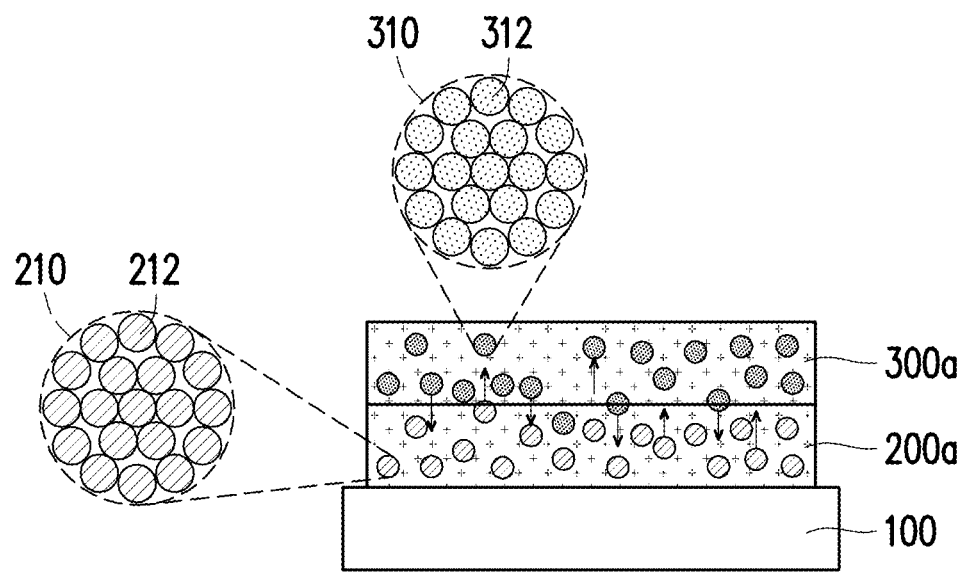
Figure 7C:
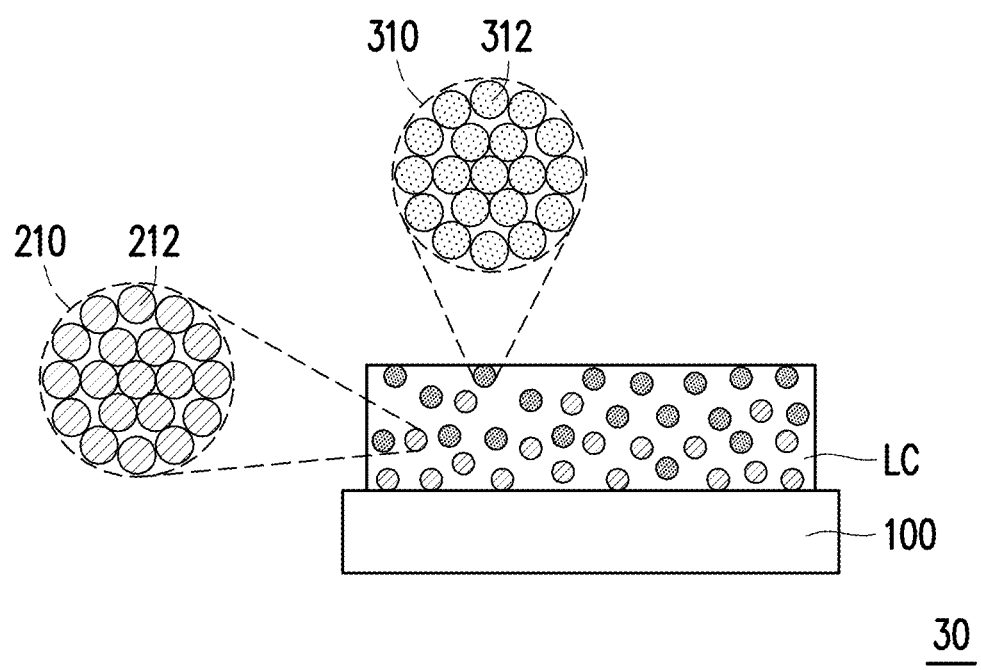

FIG. 7A to FIG. 7C are cross-sectional views of a manufacturing method of a liquid crystal panel according to an embodiment of the invention. What should be explained herein is that the embodiment of FIG. 7A to FIG. 7C uses the element numerals and part of the content of the embodiment of FIG. 5A to FIG. 5D, wherein the same or similar numerals are adopted for showing the same or similar elements, and the description of the same technical content is omitted. Reference may be made to the above-mentioned embodiment for descriptions of the omitted part, which will not be repeatedly described herein.

Referring to FIG. 7A, on the substrate 100, the first liquid crystal molecular material layer 200a and the second liquid crystal molecular material layer 300a are sequentially formed.

Referring to FIG. 7B, the first liquid crystal molecules 212 in the first liquid crystal molecular material layer 200a in the present embodiment has lower density or molecular weight than the second liquid crystal molecules 312 in the second liquid crystal molecular material layer 300a. Thus, the first liquid crystal molecules 212 (the first liquid crystal capsules 210) can float up, the second liquid crystal molecules 312 (the second liquid crystal capsules 310) can precipitate downwards, and thus the effect of mixing the first liquid crystal molecules 212 and the second liquid crystal molecules 312 is achieved.

Referring to FIG. 7C, the solvents in the first liquid crystal molecular material layer 200a and the second liquid crystal molecular material layer 300a are removed in the baking process, so that the display medium layer LC is obtained. So far, a liquid crystal panel 30 is roughly completed.

Figure 8A:
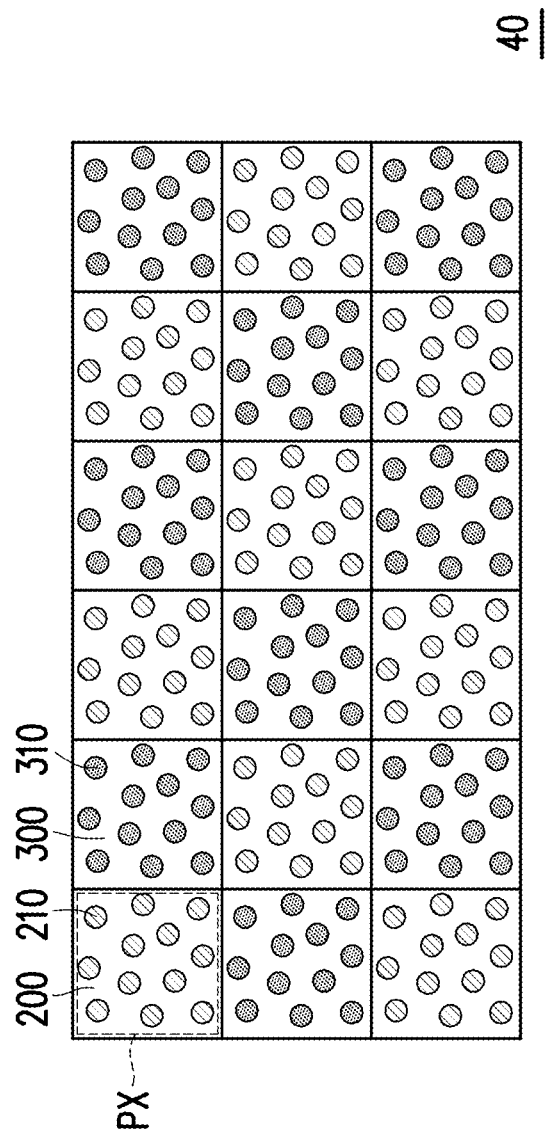
FIG. 8A is a top view of a liquid crystal panel according to an embodiment of the invention.
Figure 8B:
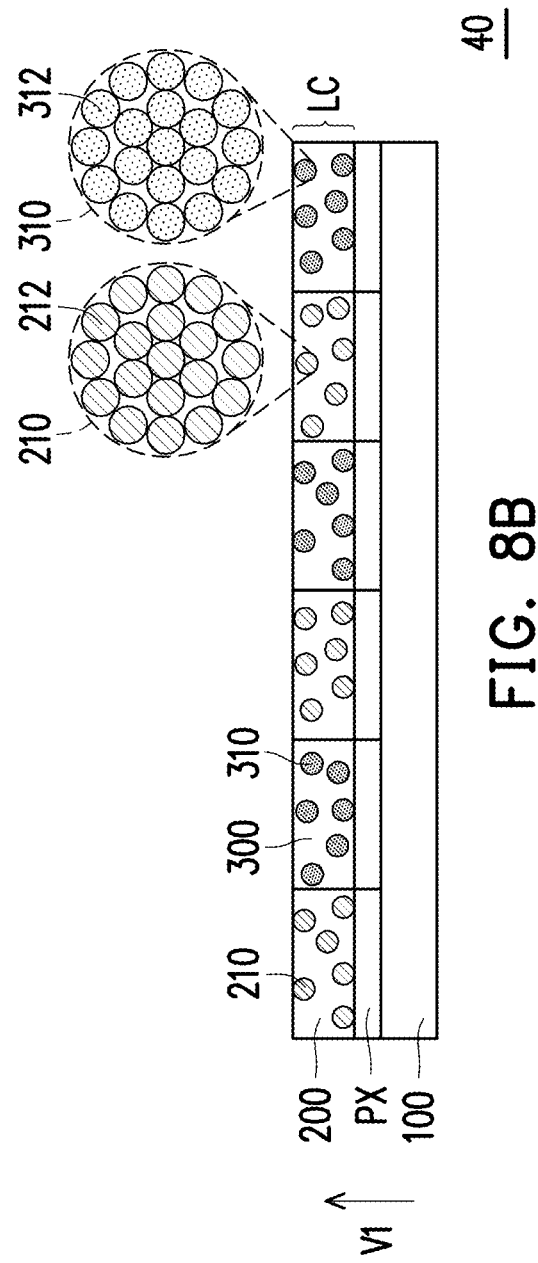
FIG. 8B is a cross-sectional view of a liquid crystal panel according to an embodiment of the invention.

FIG. 8A is a top view of a liquid crystal panel according to an embodiment of the invention. FIG. 8B is a cross-sectional view of a liquid crystal panel according to an embodiment of the invention. What should be explained herein is that the embodiment of FIG. 8A and FIG. 8B uses the element numerals and part of the content of the embodiment of FIG. 5A to FIG. 5D, wherein the same or similar numerals are adopted for showing the same or similar elements, and the description of the same technical content is omitted. Reference may be made to the above-mentioned embodiment for descriptions of the omitted part, which will not be repeatedly described herein.

Referring to FIG. 8A and FIG. 8B, in the present embodiment, a liquid crystal panel 40 further includes multiple sub-pixels PX.

The sub-pixels PX are disposed between the substrate 100 and the display medium layer LC. In the present embodiment, the first liquid crystal molecules 212 and the second liquid crystal molecules 312 do not overlap with each other in a direction V1 perpendicular to the substrate 100, and the first liquid crystal layer 200 and the second liquid crystal layer 300 do not overlap with each other in the direction V1 perpendicular to the substrate 100, but the invention is not limited thereto. The first liquid crystal molecules 212 and the second liquid crystal molecules 312 can partially overlap with each other at the junction of the first liquid crystal layer 200 and the second liquid crystal layer 300.

The first liquid crystal molecules 212 and the second liquid crystal molecules 312 respectively overlap with the different sub-pixels PX. In other words, one single sub-pixel PX overlaps with one of the first liquid crystal molecules 212 and the second liquid crystal molecules 312.

FIG. 9A is a top view of a liquid crystal panel according to an embodiment of the invention. FIG. 9B is a cross-sectional view of a liquid crystal panel according to an embodiment of the invention. What should be explained herein is that the embodiment of FIG. 9A and FIG. 9B uses the element numerals and part of the content of the embodiment of FIG. 8A and FIG. 8B, wherein the same or similar numerals are adopted for showing the same or similar elements, and the description of the same technical content is omitted. Reference may be made to the above-mentioned embodiment for descriptions of the omitted part, which will not be repeatedly described herein.

Referring to FIGS. 9A and 9B, in the present embodiment, the multiple sub-pixels PX of a liquid crystal panel 50 are disposed between the substrate 100 and the display medium layer LC. The first liquid crystal molecules 212 and the second liquid crystal molecules 312 do not overlap with each other in the direction V1 perpendicular to the substrate 100.

Each of the sub-pixels PX overlaps with the first liquid crystal molecules 212 and the second liquid crystal molecules 312. In other words, one single sub-pixel PX overlaps with the first liquid crystal molecules 212 and the second liquid crystal molecules 312 at the same time.

Based on the above, the display medium layer of the invention includes the first liquid crystal molecules and the second liquid crystal molecules at the same time, which can make the liquid crystal panel have high brightness under the different viewing angles.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A liquid crystal panel, comprising:
a substrate; and
a display medium layer, located on the substrate, wherein the display medium layer comprises:
multiple first liquid crystal capsules, wherein each of the first liquid crystal capsules comprises multiple first liquid crystal molecules, a dielectric anisotropy Δε of the first liquid crystal molecules is greater than 0, and a refractive index of the first liquid crystal capsules on a z-axis is greater than a refractive index of the first liquid crystal capsules on an x-axis and a refractive index of the first liquid crystal capsules on a y-axis; and
multiple second liquid crystal capsules, wherein each of the second liquid crystal capsules comprises multiple second liquid crystal molecules, a dielectric anisotropy Δε of the second liquid crystal molecules is greater than 0, and a refractive index of the second liquid crystal capsules on the z-axis is smaller than a refractive index of the second liquid crystal capsules on the x-axis and a refractive index of the second liquid crystal capsules on the y-axis.

2. The liquid crystal panel according to claim 1, wherein sizes of the first liquid crystal capsules and the second liquid crystal capsules are 100 nanometers to 400 nanometers.

3. The liquid crystal panel according to claim 1, wherein the first liquid crystal capsules and the second liquid crystal capsules are uniformly distributed in the display medium layer.

4. The liquid crystal panel according to claim 1, wherein an optical axis direction of the first liquid crystal capsules is the same as an optical axis direction of the second liquid crystal capsules.

5. The liquid crystal panel according to claim 1, further comprising:
multiple sub-pixels, located between the substrate and the display medium layer, wherein the first liquid crystal molecules and the second liquid crystal molecules respectively overlap with different sub-pixels.

6. The liquid crystal panel according to claim 1, further comprising:
multiple sub-pixels, located between the substrate and the display medium layer, wherein each of the sub-pixels overlaps with the first liquid crystal molecules and the second liquid crystal molecules.

7. The liquid crystal panel according to claim 1, wherein the display medium layer comprises a first liquid crystal layer and a second liquid crystal layer, the first liquid crystal molecules are located in the first liquid crystal layer, and the second liquid crystal molecules are located in the second liquid crystal layer.

8. The liquid crystal panel according to claim 7, wherein a phase retardation value per unit thickness of the first liquid crystal layer in a first direction is $a_{+1}$, a phase retardation value per unit thickness of the first liquid crystal layer in a second direction is $a_{+2}$, and a phase retardation value per unit thickness of the first liquid crystal layer in a third direction is $a_{+3}$, and
a phase retardation value per unit thickness of the second liquid crystal layer in the first direction is $a_{-1}$, a phase retardation value per unit thickness of the second liquid crystal layer in the second direction is $a_{-2}$, and a phase retardation value per unit thickness of the second liquid crystal layer in the third direction is $a_{-3}$, wherein a thickness of the first liquid crystal layer is 1.1X to 0.9X micrometers, a thickness of the second liquid crystal layer is 1.1Y to 0.9Y micrometers, and the display medium layer satisfies Formula 1 and Formula 2:

$$X=-(E_1F_1+E_2F_2)/(E_1^2+E_2^2),\text{ and} \quad \text{Formula 1:}$$

$$Y=(R-PX)/Q \quad \text{Formula 2}$$

where $E_1$ is $A_1-((B_1P)/Q)$, $E_2$ is $A_2-((B_2P)/Q)$, $F_1$ is $(B_1R)/Q$, and $F_2$ is $(B_2R)/Q$ where $A_1$ is $a_{+1}-a_{+2}$, $B_1$ is $a_{-1}-a_{-2}$, $A_2$ is $a_{+3}-a_{+2}$, $B_2$ is $a_{-3}-a_{-2}$, and Formula 2 is a minimum solution of $(A_1X+B_1Y)^2+(A_2X+B_2Y)^2$.

9. The liquid crystal panel according to claim 8, wherein an included angle between the first direction and the z-axis is 30 degrees to 50 degrees, an included angle between a projection of the first direction on a plane formed by the x-axis and the y-axis and the x-axis is −10 degrees to 10 degrees, an included angle between the second direction and the z-axis is −10 degrees to 10 degrees, an included angle between a projection of the second direction on the plane formed by the x-axis and the y-axis and the x-axis is −10 degrees to 10 degrees, an included angle between the third direction and the z-axis is 30 degrees to 50 degrees, and an included angle between a projection of the third direction on the plane formed by the x-axis and the y-axis and the x-axis is 80 degrees to 100 degrees.

10. The liquid crystal panel according to claim 9, wherein the included angle between the first direction and the z-axis is 40 degrees, the included angle between the projection of the first direction on the plane formed by the x-axis and the y-axis and the x-axis is 0 degrees, the included angle between the second direction and the z-axis is 0 degrees, the included angle between the projection of the second direction on the plane formed by the x-axis and the y-axis and the x-axis is 0 degrees, the included angle between the third direction and the z-axis is 40 degrees, and the included angle between the projection of the third direction on the plane formed by the x-axis and the y-axis and the x-axis is 90 degrees.

11. The liquid crystal panel according to claim 9, wherein the y-axis is parallel with an electric field direction in the display medium layer.

12. The liquid crystal panel according to claim 1, wherein the y-axis is parallel with an electric field direction in the display medium layer.

13. The liquid crystal panel according to claim 1, wherein part of the first liquid crystal molecules are represented by Chemical Formula 1 below:

[Chemical Formula 1]

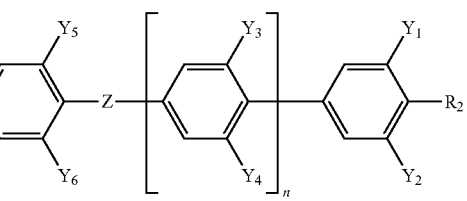

where R1 and R2 are each independently hydrogen, halogen or an alkyl group having 1 to 20 carbon atoms, one —$CH_2$— in the alkyl group having 1 to 20 carbon atoms is substituted or unsubstituted by —O—, —S— or —CH=CH—, and hydrogen in the alkyl group having 1 to 20 carbon atoms is substituted or unsubstituted by fluorine, where $Y_1$, $Y_2$, $Y_3$, $Y_4$, $Y_5$ and $Y_6$ are each independently hydrogen or fluorine, where Z is —$CH_2$—, —$CH_2$—$CH_2$—, —$(CH_2)_3$—, —$CH_2$=$CH_2$—, —COO—, —OOC—$CF_2$O—, —$OCH_2$—, —$CH_2O$—, $OCF_2$—, —CH≡CH— or a single bond, and n is greater than or equal to 1.

14. The liquid crystal panel according to claim 1, wherein part of the second liquid crystal molecules are represented by Chemical Formula 2 or Chemical Formula 3 below:

[Chemical Formula 2]

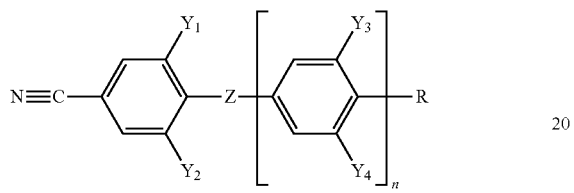

[Chemical Formula 3]

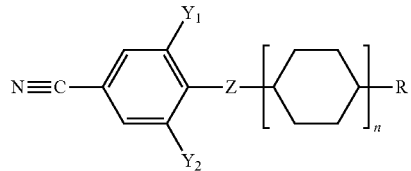

where R is hydrogen, halogen or an alkyl group having 1 to 20 carbon atoms, one —$CH_2$— in the alkyl group having 1 to 20 carbon atoms is substituted or unsubstituted by —O—, —S— or —CH=CH—, and hydrogen in the alkyl group having 1 to 20 carbon atoms is substituted or unsubstituted by fluorine, where $Y_1$, $Y_2$, $Y_3$ and $Y_4$, are each independently hydrogen or fluorine, where Z is —$CH_2$—, —$CH_2$—$CH_2$—, —$(CH_2)_3$—, —$CH_2$=$CH_2$—, —COO—, —OOC—$CF_2$O—, —$OCH_2$—, —$CH_2O$—, $OCF_2$—, —CH≡CH— or a single bond, and n is greater than or equal to 1.

* * * * *